United States Patent
Schmidt et al.

(10) Patent No.: US 7,668,133 B2
(45) Date of Patent: Feb. 23, 2010

(54) PRESENCE SERVER UNIT

(75) Inventors: Andreas Schmidt, Braunschweig (DE); Holger Schmidt, Braunschweig (DE)

(73) Assignee: Infineon Technologies AG (DE)

( * ) Notice: Subject to any disclaimer, the term of this patent is extended or adjusted under 35 U.S.C. 154(b) by 658 days.

(21) Appl. No.: 11/299,278

(22) Filed: Dec. 8, 2005

(65) Prior Publication Data
US 2006/0120281 A1    Jun. 8, 2006

(30) Foreign Application Priority Data
Dec. 8, 2004    (DE)    ........................ 10 2004 059 145

(51) Int. Cl.
*H04W 4/00*    (2006.01)
(52) U.S. Cl. ........................ 370/328; 370/401; 370/252; 455/432.3; 455/456.3
(58) Field of Classification Search ................ 370/328, 370/401, 252; 455/432.3, 456.3
See application file for complete search history.

(56) References Cited

U.S. PATENT DOCUMENTS 6,223,046 B1    4/2001    Hamill-Keays et al.

2005/0135240 A1*    6/2005    Ozugur ........................ 370/229
2006/0031293 A1*    2/2006    Thommes et al. ........... 709/204
2006/0165058 A1*    7/2006    Caballero-McCann et al. ... 370/352

FOREIGN PATENT DOCUMENTS

EP    1 441 486 A2    7/2004

OTHER PUBLICATIONS

3rd Generation Partnership Project; 3GPP TS 22.141 v6.2.1 (Jul. 2004), Technical Specification Group Services and System Aspects; Presence Service; Stage 1 (Release 6).
3rd Generation Partnership Project; 3GPP TS 23.141 v6.7.0 (Sep. 2004); Technical Specification Group Services and System Aspects; Presence Service; Architecture and functional description (Release 6).

* cited by examiner

*Primary Examiner*—Barry W Taylor
(74) *Attorney, Agent, or Firm*—Dickstein, Shapiro, LLP.

(57) ABSTRACT

A presence server unit, which manages presence information relating to the availability of a communication unit and informs a plurality of checking units about changes to the presence information on the basis of a notification ranking which is specified by priority information.

12 Claims, 2 Drawing Sheets

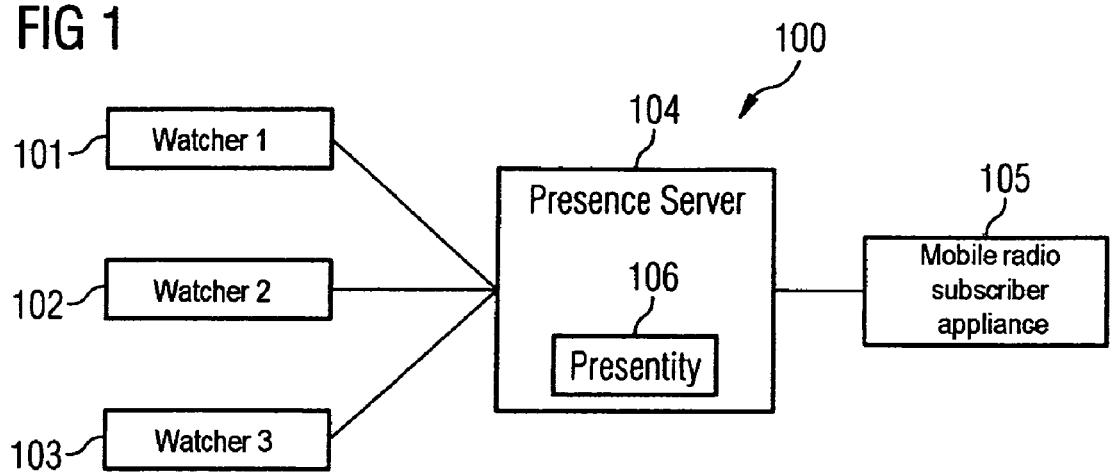
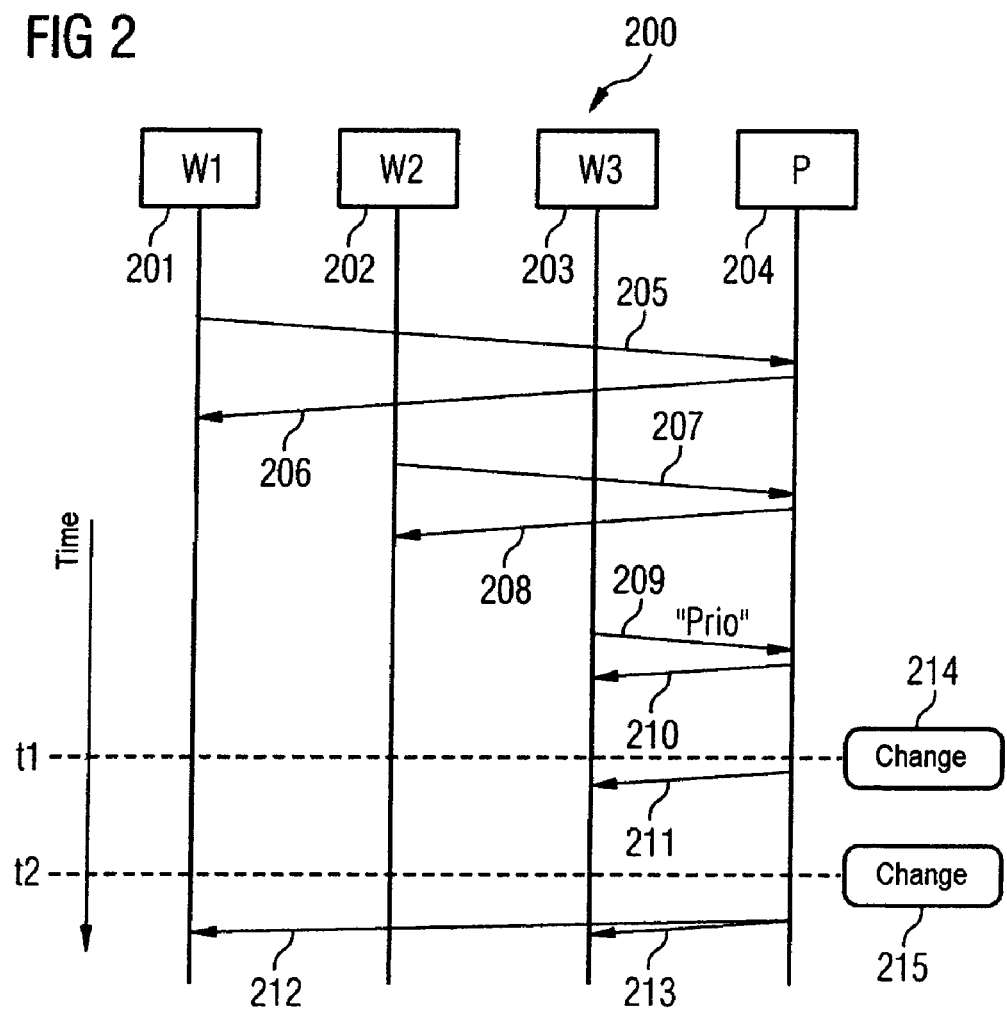

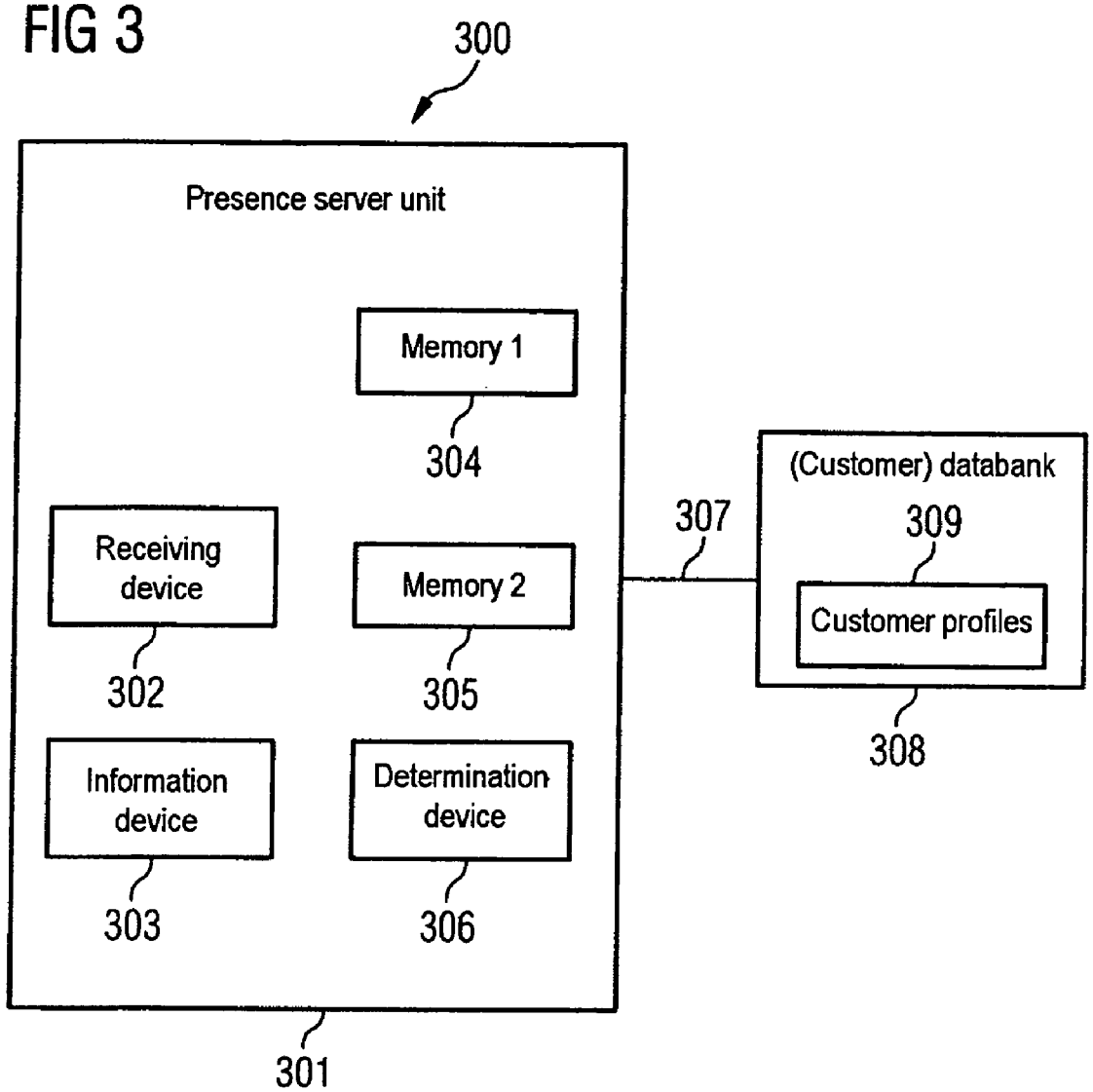

PRESENCE SERVER UNIT

CROSS-REFERENCE TO RELATED APPLICATION

This application claims priority to German Patent Application Serial No. 10 2004 059 145.8-31, which was filed on Dec. 8, 2004 and is incorporated herein by reference in its entirety.

FIELD OF THE INVENTION

The invention relates to a presence server unit, to a method for controlling a presence server unit, to a communication arrangement and to a method for operation of a communication arrangement.

BACKGROUND OF THE INVENTION

In the course of use of the Internet, it has been known for some time for information to be made accessible to users relating to the availability of another user, for example by means of programs such as ICQ. For example, a user can thus check whether another user is currently at his computer, and/or has switched the computer on and can receive and read text messages in a corresponding manner.

A service such as this is referred to as a presence service. A presence service is in general a service in which presence information relating to a user is managed with the aim of making the presence information accessible to applications, for example computer applications, to other users or to other services. The presence information may relate not only to people, but also to other services, (server) computers, objects etc.

Typical examples of presence information include information about the location, the state, the mood, the communication readiness (willingness) and the communication capability (ability) of a person (or of an object, for example of a server computer). The presence information generally comprises time-dependent functions.

The total of all of the presence information associated with a person or an object is referred to as the presentity of the person or of the object. Furthermore, a set of rules with restrictions may be a component of the presentity which, for example, specifies how and in what circumstances the presence information relating to the presentity may be passed on, interchanged or made known, for example by specifying appropriate access rights.

A presence service may be offered as an autonomous service, or may be combined with another service.

A presence service may be combined with a telecommunications service, for example, since in this case, the communication readiness and/or the communication capability of a (tele)communication partner desired by a user can in fact be checked by the user (a) before setting up a communication link between the user and the communication partner and (b) before interchanging communication data by means of the telecommunications service between the user and the communication partner.

One typical example of a combination of a telecommunication service with a presence service is for a communication link to be set up automatically between the communication terminal being used by the user (who has configured this appropriately) and the communication terminal of the communication partner designed by the user, as soon as a previous communication link to the communication terminal of the desired communication partner has ended, that is to say obviously when there is a change in the state of the communication terminal of the desired communication partner from "busy" to "free", with the presence service signaling this state change to the communication terminal of the user.

When using a presence service, a user can control the dissemination of his presence information to other users and/or other services and can define groups of users and/or groups of services to which he wishes to make his presence information available entirely or partially, for example restricted by defined conditions. Furthermore, the user has the capability to check presence information of other users. Overall, the user can set up a large number of combinations of interactions between users and services in accordance with his individual wishes.

As mentioned, the Internet offers presence services with basic functionalities, although the various presence services have poor compatibility and can interact with one another only with considerable effort.

The telecommunications standardization committees are currently working on tasks relating to the provision of presence services in mobile radio communication systems.

A presence service for a mobile radio communication system is described in the document 3rd Generation Partnership Project (3GPP): TS 22.141 v6.2.1, Technical Specification Group 'Services and System Aspects', Presence Service Stage 1, and in 3rd Generation Partnership Project (3GPP): TS 23.141 v6.6.0, Technical Specification Group 'Services and System Aspects', Presence Service, Architecture and Functional Description, which is distinguished by also having functionalities by means of which the specific requirements for mobile radio are taken into account, in addition to the fundamental functionalities which are known from the Internet. For the purposes of the presence information, specific attributes are thus supported, which are important for wire-free communication purposes.

The document 3rd Generation Partnership Project (3GPP): TS 22.141 v6.2.1, Technical Specification Group 'Services and System Aspects', Presence Service Stage 1 (Chapter 4) contains, in particular, the specification for a presence service based on the 3GPP (Third Generation Partnership Project) Standard.

Typically, a presence service is provided by a network component, for example a mobile radio communications system, which network component is typically referred to as a presence server and manages the presentity of a person (or object).

That instance, for example the mobile radio subscriber appliance of a user, which is checking the presence information for a person or an object is referred to as the watcher. The watchers are subdivided into fetchers (watchers on one occasion), pollers (regular watchers) and subscribed watchers.

A watcher is, for example, in the form of a software program which is run on a mobile radio subscriber appliance. A subscribed watcher is a watcher which requests that information corresponding to a presentity be transmitted to it when there is a change to the presence information. For this purpose, a subscribed watcher must register with a presence server. For example, it sends a message to a presence server by means of which the subscribed watcher requests to be informed about any change to the presence information contained in the presentity. The presence server responds to the message, for example, by means of a confirmation message which contains the current presence information for the presentity.

If the presence information contained in the presentity subsequently changes, then the subscribed watcher is informed about this change by the presence server by means of an appropriate message.

A fetcher is a watcher which requests presence information about a presentity only once. The fetcher accordingly sends a message to a presence server, and the presence server responds by means of a further message, which contains the requested presence information.

A poller is a watcher which regularly checks the presence information relating to a person/object.

Presence information may be transmitted in the form of complete data records, that is to say the presence information relating to a presentity may always be transmitted completely. If, however, a watcher relatively frequently receives presence information relating to a specific presentity from a presence server, as in the case in particular with a subscribed watcher, then it is also possible to transmit to the watcher only that presence information which has changed since presence information relating to this presentity was last transmitted.

As mentioned, a watcher is sent presence information only when this watcher has the necessary right for this purpose. A user can restrict the checking of his presence information by means of appropriate access rights, and can thus control the passing on of the presence information.

When the presence information relating to a presentity changes, then all of the subscribed watchers which have requested to be informed about the change to the presence information are informed about the change at the same time (or at least close to the same time).

Particularly in the context of a mobile radio communication system, this is disadvantageous when two subscribed watchers, for example, attempt as a reaction to the information about the change to the presence information to set up a communication link to the person/object corresponding to that presentity (for example when the change to the presence information comprises the person/object now being available). If the subscribed watchers are in the form of suitable communication terminals, and the users of the communications terminals have implemented appropriate user settings, this can be carried out completely automatically, that is to say without any interaction with the user. However, if only a single communication link can be set up to the person/object, then a communication link can be set only between one of the subscribed watchers (or between a mobile radio subscriber appliance) and the person/object.

A user who is acting as a subscribed watcher, that is to say has requested by means of his mobile radio subscriber appliance that appropriate change information is sent to his mobile radio subscriber appliance whenever there is a change to the presence information relating to a person/object, may, for example, choose to be informed about the change to the presence information by audible signaling, for example by his mobile radio subscriber appliance emitting a pipping tone.

When the person/object becomes available in a situation such as this (since, for example, an existing communication link to that person/object has been cleared and a communication link can now be set up to him or it), then this is signaled to the user, for example by means of audible signaling. However, if a further subscribed watcher is automatically setting up a communication link to the person/object, then the presence information relating to that person/object changes again after a short time (to "not available"), without the user having time to himself set up a communication link to that person/object. Since the second change to the presence information is also signaled audibly to the user, the user's mobile radio subscriber appliance produces two audible signals for the user shortly after one another, although these are useless for that user and are typically only disturbing.

Conversely, if the person/object whose presence information is requested is a user to whom attempts to set up communication links to him are signaled ("ringing signaling"), then, when a plurality of subscribed watchers attempt to set up a communication link to that user once he or it has become available the attempt to set up a communication link (ringing) is signaled repeatedly even after one of the subscribed watchers (obviously the fastest) was successful in setting up a communication link to him or it.

Overall, this results in a large number of unnecessary signaling activities, both to the subscribed watchers who are informed about the frequently changing presence information worthlessly, and to the user for example by audible ringing signaling.

This leads on the one hand to unnecessary load on the communications network by the transmission of worthless transmissions to the subscribed watchers and to a low level of user friendliness.

EP 1441486 A2 describes a presence service system in which a plurality of watchers may ask to be informed about changes to presence information. A rule is used to determine the sequence in which the watchers are informed when the presence information changes. For example, the watcher who is the first to make the request is the first to be informed about a change to the presence information.

SUMMARY OF THE INVENTION

A presence server unit having a manager, a receiving device, a memory, and an information device. The manager is designed to manage presence information relating to the availability of a communication unit. The receiving device is designed to receive a message from each checking unit of a plurality of checking units, which message specifies that, when the presence information is changed, change information relating to the change to the presence information should be transmitted to the respective checking units. The memory has priority information stored therein, which priority information is information relating to a notification ranking on the basis of which the change information should be transmitted to the plurality of checking units and which is contained at least partially in the message received from one checking unit of the plurality of checking units, with the priority information which is contained in the message which is received from the checking unit of the plurality of checking units specifying that the change information should be transmitted to this checking unit before the change information is transmitted to the other checking units in the plurality of checking units. The information device is designed to transmit the change information, when the presence information is changed, in accordance with the notification ranking to the plurality of checking units.

There is also a method for controlling the presence server unit, a communication arrangement, and a method for operating the communication arrangement.

BRIEF DESCRIPTION OF THE DRAWINGS

Exemplary embodiments of the invention will be explained in more detail in the following text and are illustrated in the figures.

FIG. 1 shows a communication system according to one exemplary embodiment of the invention.

FIG. 2 shows a message flowchart according to one exemplary embodiment of the invention.

FIG. 3 shows an arrangement according to one exemplary embodiment of the invention.

DETAILED DESCRIPTION OF PREFERRED EMBODIMENTS OF THE INVENTION

The invention is based on the problem of providing a presence service which is more efficient and more user friendly than the prior art.

The problem is solved by a presence server unit, by a method for controlling a presence server unit, by a communication arrangement and by a method for operation of a communication arrangement.

A presence server unit is provided which manages presence information relating to the availability of a communication unit. The presence server unit has a receiving device which is designed to receive a message from each checking unit of a plurality of checking units, which message specifies that, when the presence information is changed, change information relating to the change to the presence information should be transmitted to the respective checking unit. The presence server unit also has a memory in which priority information is stored, which priority information is information relating to a notification ranking on the basis of which the change information should be transmitted to the plurality of checking units. The presence server unit also has an information device which is designed to transmit the change information, when the presence information is changed, in accordance with the notification ranking to the plurality of checking units.

A method for controlling a presence server unit, a communication arrangement and a method for operation of a communication arrangement based on the presence server unit described above are also provided.

One idea on which the invention is based is that the watchers, that is to say the checking units, can be ranked, on the basis of which ranking the watchers are informed about a change to the presence information.

The expression information relating to the availability of the communication unit should be understood as meaning, in particular, the information as to whether it is possible to set up a communication link to that communication unit.

The invention is particularly advantageous for that presence information which, if it changes, is used by a watcher who is informed about the change and who wishes to set up a communication link to that communication unit, for example another user to decide whether to attempt to set up a communication link to that user, for example in the event of a change to the availability presence information (in the case of a change to "available") or the communication readiness presence information (in the event of a change to "ready to communicate"). The attempt to set up a communication link to the user can be carried out automatically in the event of a change such as this to the presence information (provided that the watcher has selected this).

If the priority information is suitably defined such that only one watcher who wishes to set up a communication link to the communication unit is informed about availability (which has just occurred) of the communication unit, then this avoids a plurality of watchers unnecessarily (since only one communication link can be set to that communication unit) being informed about the availability of that communication unit. This is advantageous because watchers are not unnecessarily informed about the availability and are not unnecessarily frustrated by being informed about the availability but not being able to set up a communication link since a plurality of watchers wish to set up a communication link.

The avoidance of unnecessary signaling to the watchers that the presence information has changed increases, in particular, the user friendliness for the watchers when a change to the presence information is indicated audibly and/or in a tactile form to the watchers (for example by means of a vibration alarm).

Furthermore, there is no unnecessary signaling on the communication interface (for example a radio interface) between the presence server unit and the checking units, thus reducing the load on the communication interface.

Furthermore, this avoids the frequent "ringing" of the communication unit which occurs when a plurality of watchers are attempting to set up a communication link to that communication unit.

A part from the capability to set up a communication link to the communication unit, the presence information can also specify, for example, whether a user of the communication unit wishes to set up a communication link, for example wishes to be called, that is to say he or it can specify the communication readiness (willingness) or else the location, the state, the mood and the communication capability (ability) of the user.

The priority information may be transmitted by the communication unit itself, for example a user of the communication unit, to the presence server unit. A user (or an object) whose presence information/presentity is being checked is obviously able to set up a set of rules for prioritized notification of his or its presence information when his or its presence information changes.

Furthermore, the priority information can also be transmitted from a checking unit to the presence server unit. By the use of a priority, a watcher is obviously able to signal to the presence server unit, for example a presence server, additional information relating to the urgency of the check of presence information, for example the urgency for a communication link to a user whose presence information is intended to be checked.

The priority information is obviously used by the presence server unit for prioritized transmission of a (change) information relating to the change (which has just taken place) to the presence information and accordingly not to inform the watchers about the change to the presence information at the same time, but with a time delay.

The presence server unit may also have a further memory in which rules for the creation of the notification ranking are stored. The presence server unit can also have a determination device, which is designed to apply the rules stored in the further memory to the requests arriving via the receiving device from the checking units. The presence server unit may optionally have one or more interfaces to at least one (customer) databank (for example of a mobile radio network operator), by means of which the presence server unit can obtain knowledge about the customer profiles which are associated with the checking units, for example the customer profiles of the users of the checking units. The customer profiles obtained in this way can additionally be taken into account by the determination device in the handling of the requests that arrive.

The further refinements of the invention which are described in conjunction with the presence server unit also apply in the same sense to the method for controlling a presence server unit, to the communication arrangement and to the method for operation of a communication arrangement.

It is preferable for the priority information to be contained at least partially in the message which is received from one checking unit of the plurality of checking units.

The priority information which is contained in the message received from the checking unit from the plurality of checking units preferably specifies that the change information should be transmitted to that checking unit before the changed information is transmitted to the other checking units from the plurality of checking units.

A watcher can obviously signal that he wishes to be informed with a high priority about a change to the presence information.

It is furthermore preferable for the priority information to be at least partially defined by a user of the communication unit.

The user can obviously decide which watchers are granted preference to be informed about changes to the presence information.

It is furthermore preferable for the presence server unit to have a determination device, which is designed to determine the notification ranking using the priority information.

It is furthermore preferable for the at least one checking unit from the plurality of checking units to be a communication terminal.

At least one checking unit from the plurality of checking units is preferably a mobile radio subscriber appliance.

It is furthermore preferable for the presence information to specify whether a communication link can be set to that communication unit.

The communication unit is preferably a mobile radio subscriber appliance.

The use of the invention obviously allows mobile radio subscribers to be informed with a high level of user friendliness as to whether another mobile radio subscriber is available, whether this subscriber is registered, for example, in the appropriate mobile radio communication network, and whether this subscriber is currently making a telephone call, etc. This avoids mobile radio subscribers from being unnecessarily informed that a mobile radio subscriber is available. Furthermore, "urgent callers" or else callers who are given preference by the called subscriber are provided with the capability to be informed separately (with preference) about the availability of the subscriber being called.

The invention is particularly advantageous for mobile radio communication network purposes, since the presence information, in particular the availability of mobile radio subscribers, changes frequently. If, by way of example, a mobile radio subscriber is traveling on the subway, he is briefly unaccessible for the duration of the journey, or if the mobile radio subscriber switches his mobile radio subscriber appliance off, for example in the cinema, he is unaccessible for the duration of the film. Another mobile radio subscriber who has to contact the mobile radio subscriber urgently can be informed with priority when the mobile radio subscriber is available again without any need to be concerned about "competition" from other mobile radio subscribers who likewise wish to call that mobile radio subscriber.

Furthermore, it is preferable for the notification ranking to specify that a first portion of the plurality of checking units should be informed first of all about the change to the presence information, with the intention of informing the remainder of the plurality of checking units about the change to the presence information when a further change takes place to the presence information and/or after a defined time period after a change to the presence information if no communication link to the communication unit has been set up in that time period.

FIG. 1 shows a communication system 100 according to one exemplary embodiment of the invention.

A first watcher 101, a second watcher 102 and a third watcher 103 are coupled to a presence server 104.

The watchers 101, 102, 103 according to this exemplary embodiment of the invention are each implemented by means of a computer program, which is executed on a mobile radio subscriber appliance.

The coupling between the watchers 101, 102, 103 and the presence server 104 is provided in this exemplary embodiment by means of a radio mobile communication system which is configured, for example, in accordance with the GSM (Global System for Mobile Communication) Standard, the GPRS (General Packet Radio Service) Standard, the UMTS (Universal Mobile Telecommunication System) Standard or the EDGE (Enhanced Data rate for Global Evolution) Standard.

The presence server 104 manages a presentity 106 of a user who or which is using a mobile radio subscriber appliance 105 which is coupled to the presence server 104 by means of the mobile radio communication system. The presence server 104 is, for example, in the form of a server computer coupled to the mobile radio communication system.

The presentity 106 for the user contains presence information relating to that user, for example relating to his location, relating to the state of the mobile radio subscriber appliance 105 (for example switched on/off), relating to the mood of the user (for example whether the user would or would not be happy to be called at the moment), relating to the communication readiness and relating to the communication capability of the user and/or of the mobile radio subscriber appliance 105 (availability, network availability, reception quality), for example the information as to whether the mobile radio subscriber appliance 105 is or is not currently registered in the mobile radio communication network.

The coupling between the presence server 104 and the mobile radio subscriber appliance 105 makes it possible for the presence server 104 to keep the presence information in the presentity 106 relating to the user up-to-date.

The watchers 101, 102, 103 can check the presence information stored in the presentity 106 for the user from the presence server 104, provided that conditions are satisfied that are specified by rules which are likewise contained in the presentity 106, for example access rights for access to the presence information.

The watchers 101, 102, 103 may be fetchers, that is to say they may check presence information relating to the user once (or once in a relatively long time period), pollers, that is to say they check presence information relating to the user regularly (relatively frequently), or subscribed watchers, that is to say watchers who have requested the presence server 104 to inform them about any change (or about any change in a relatively long time period) to the presence information for that user.

A user who or which is the user using the mobile radio subscriber appliance corresponds to each of the watchers 101, 102, 103, by means of which the corresponding watcher 101, 102, 103 is implemented.

One example relating to the checking of presence information by the watchers 101, 102, 103 will be explained in the following text with reference to FIG. 2.

FIG. 2 shows a message flowchart 200 according to one exemplary embodiment of the invention.

The illustrated message flow takes place between a first watcher 201, a second watcher 202, a third watcher 203 and a presence server 204, which are arranged and configured as shown in FIG. 1.

The expression users in the following text refers to those users whose presence information is checked in the course of the illustrated message flow, that is to say the user of the mobile radio subscriber appliance 105.

This example is based on the assumption that the presence information in the presentity 106 is the information as to whether that user can be accessed (is available) by means of the mobile radio subscriber appliance 105. For example, the user is not available when there is an existing communication link between the mobile radio subscriber appliance 105 and another mobile radio subscriber appliance.

The first watcher 201 acts as a subscribed watcher and accordingly sends a message in a step 205 to the presence server 204, containing a request which specifies that the first watcher 201 should be informed about the change when any change takes place to the presence information of the user, and should be informed in a corresponding manner about the changed presence information.

In a step 206, the presence server confirms the request from the first watcher 201 by means of an appropriate message, which also contains the current presence information for that user.

The second watcher 202 in this exemplary embodiment acts as a fetcher, and accordingly uses an appropriate message in a step 207 to send a request to the presence server 204 for the presence information relating to that user. The presence server 204 responds to this request in a step 208 by transmitting a message to the second watcher 202, containing the up-to-date presence information.

The third watcher 203 acts as a subscribed watcher and therefore, in a step 209, uses an appropriate message to send the requests to the presence server 204 that the third watcher 203 should be informed about the change, and about the changed presence information, whenever the presence information is changed.

Furthermore, the request includes the note that the next message relating to changed presence information should be sent to the third watcher 203 with priority. The presence server accordingly creates a priority rule which states that the next message to the third watcher 203 relating to changed presence information for the user should be dealt with with priority and, in a step 210, transmits an appropriate confirmation message to the third watcher 203, with this message also including the up-to-date presence information.

In this exemplary embodiment, the priority indicates that the third watcher 203 should obviously be informed about the next change to the presence information before the other subscribed watchers. In other embodiments, the priority could also specify that special access rules which control the access to the presence information apply to the third watcher 203. By way of example, the user could have made a selection such that, at the moment, the only watchers who should be informed about a change to the presence information are those which have a priority, that is to say those which have requested to be informed about changes to the presence information with priority.

In one embodiment, the request messages which are transmitted in the steps 205, 207 and 209 always have a specification of the presence information which should be sent to the corresponding watchers 201, 203, 203, for example the first watcher 201 should be informed only about the communication readiness of the user, while no other presence information should be sent to the first watcher 201. In this case, only the specified, that is to say requested, presence information is transmitted in the steps 206, 208 and 210. (As mentioned, this example is based on the assumption that the presence information consists exclusively of availability information).

The transmission of presence information in this exemplary embodiment is always based on the assumption that the conditions specified in the presentity are satisfied by the watchers 201, 202, 203.

It is assumed that the presence information relating to the user changes on the basis of a first change 214 at the time $t_1$. According to the priority rule created by the presence server 204, even though the first watcher 201 and the third watcher 203 act as subscribed watchers, only the third watcher 203 is informed, in a step 211, by the presence server 204 about the first change 214 to the presence information (and about the changed presence information), by the presence server 204 sending a message to the third watcher 203, containing the up-to-date presence information.

If the presence information (contrary to the assumption in this example) comprises a plurality of information items, then the presence information can be transmitted completely from the presence server 204 to the third watcher 203, or only that presence information which has changed since the transmission of the presence information to the third watcher 203 in the step 210.

Only the third watcher 203, which has appropriate priority, is informed about the first change 214 to the presence information. If the first change 214 to the presence information is that the user is now available, then the third watcher 203, and the user corresponding to the third watcher 203, are in this way provided with the capability to set up a communication link to the mobile radio subscriber appliance 105 without being impeded in the process by the first watcher 201 or by the user corresponding to the first watcher 201 (by setting up a communication to the mobile radio subscriber appliance 105). (Except in the situation in which the user corresponding to the first watcher 201 randomly attempts to set up a communication link to the mobile radio subscriber appliance 105, although this is improbable, since the first watcher 201 will not have been informed that the user is now available).

The user corresponding to the third watcher 203 can now set up a communication link to the mobile radio subscriber appliance 105.

If the user corresponding to the third watcher 203 now sets up a communication link to the mobile radio subscriber appliance 105, then this likewise leads to a second change to the presence information (not shown), since the user is now unavailable once again. The second change to the presence information is not signaled to either the first watcher 201 or the third watcher 203.

Once communication has been set up successfully, the first watcher 201 thus once again has the (now once again) correct information that the user is not available.

When the communication link between the third watcher (or the corresponding mobile radio subscriber appliance) and the mobile radio subscriber appliance 105 ends, then this leads to a third change 215 to the presence information (at the time $t_2$), which is signaled to the first watcher 201 in a step 212 and to the third watcher 203 in a step 213 by means of appropriate messages, that is to say by the transmission of messages which contain the up-to-date presence information.

If the user corresponding to the third watcher 203 does not set up a communication link to the mobile radio subscriber appliance 105 within a specific time period after the message relating to the first change 214 to the presence information in the step 211, then the first watcher 201 is informed about the first change 214 in a step 212, by means of a message which contains the up-to-date presence information.

If a further watcher has sent a request for signaling of presence information with priority to the presence server 204 in the meantime (since the step 211), then this watcher is informed with priority about the third change 215 in an analogous manner to that above, and, for example, the first watcher 201 is not informed about the third change or, if the third watcher 203 has not set up a communication link to the mobile radio subscriber appliance 105, is (still) not informed about the first change 214.

In another embodiment, the user of the mobile radio subscriber appliance 105 defines at the start, in this example even before the step 205, a set of priority rules himself or itself. This set of priority rules specifies which watcher will be informed of a change and about the changed presence information when a change to the presence information occurs, and/or when watchers will be notified of changed presence information.

In a corresponding manner to the example illustrated in FIG. 2, the user has, for example, defined that the third watcher 203 should be informed with priority of changed presence information. There is therefore no need in the step 209 for the third watcher to indicate in his request to be informed with priority about changed presence information. On the basis of the priority rule defined by the user, the third watcher is informed, in accordance with the step 211, solely about the change 214 to the presence information (and about the changed presence information). The rest of the procedure is identical to that described above.

FIG. 3 shows an arrangement 300 according to one exemplary embodiment of the invention.

The arrangement has a presence server unit 301 which, for example, corresponds to the presence server 104. The presence server unit 301 has the following devices: a receiving device 302, an information device 303, a first memory 304, a second memory 305 and a determination device 306.

The presence server unit 301 is optionally coupled by means of an interface 307 to a (customer) databank 308, in which customer profiles 309 are stored.

The receiving device 302 is designed to receive a message from each checking unit from a plurality of checking units, for example the watchers 101, 102, 103, which message specifies that, when there is a change to the presence information, change information relating to the change to the presence information should be transmitted to the respective checking unit.

Priority information is stored in the first memory 304, and rules relating to the creation of the notification ranking are stored in the second memory 305.

The determination device 306 is designed to apply the rules which are stored in the second memory 305 to the requests which arrive via the receiving device 302, that is to say to create a notification ranking.

As mentioned, the presence server unit 301 optionally has at least one interface 307 to at least one (customer) databank 308 (for example the HLR—Home Location Register of the mobile radio network operator), via which the presence server unit 301 can obtain information about the customer profiles 309 of the users of the checking units. The customer profiles 309 can additionally be taken into account by the determination device 306 in the creation of a (notification) ranking for the watchers.

The information device 303 is designed to transmit the change information on the basis of the notification ranking to the appropriate checking unit or units when the presence information changes.

In another embodiment, the procedure is based on a combination of the examples described above. For example, watchers can create requests with priority for information about changed presence information and a ranking of the watchers can be determined on the basis of the priority rules defined by the user and taking into account the priorities of the various watchers, on the basis of which ranking the watchers are informed about changes to the presence information. For example, when a change occurs to the presence information, a first watcher is informed first of all, and if this watcher has not initiated the setting up of any communication link after a defined time period, a second watcher (following the first watcher in the ranking) is informed about the changed presence information and, if this watcher has also not initiated the setting up of any communication link after a defined time period, all the further watchers, that is to say all of the further subscribed watchers, are informed about the changed presence information.

In another embodiment, groups of watchers jointly produce requests for the information about changed presence information. In a corresponding manner, the priority rules defined by the user can apply to groups of watchers.

In a further embodiment, further restrictions are taken into account in the creation of a ranking for the watchers. For example, the consideration of requests with priority could relate only to pre-paid customers, only to contract customers, only during the daytime and/or only during the nighttime, or the like. For this purpose, the presence server can ideally be connected via at least one interface to at least one (customer) databank for the mobile radio network operator (for example the Home Location Register, HLR), and in this way can obtain customer-specific information for determination of the resultant notification ranking.

What is claimed is:

1. A presence server unit comprising:
a manager which is designed to manage presence information relating to the availability of a communication unit;
a receiving device which is designed to receive a message from each checking unit of a plurality of checking units, which message specifies that, when the presence information is changed, change information relating to the change to the presence information should be transmitted to the respective checking units;
a memory in which priority information is stored, which priority information is information relating to a notification ranking on the basis of which the change information should be transmitted to the plurality of checking units and which is contained at least partially in the message received from one checking unit of the plurality of checking units, with the priority information which is contained in the message which is received from the checking unit of the plurality of checking units specifying that the change information should be transmitted to this checking unit before the change information is transmitted to the other checking units in the plurality of checking units; and
an information device which is designed to transmit the change information, when the presence information is changed, in accordance with the notification ranking to the plurality of checking units.

2. The presence server unit as claimed in claim 1, wherein the priority information is at least partially defined by a user of the communication unit.

3. The presence server unit as claimed in claim 1, wherein the presence server unit has a determination device, which is designed to determine a notification ranking using the priority information.

4. The presence server unit as claimed in claim 1, wherein at least one checking unit from the plurality of checking units is a communication terminal.

5. The presence server unit as claimed in claim 1, wherein at least one checking unit from the plurality of checking units is a mobile radio subscriber appliance.

6. The presence server unit as claimed in claim 1, wherein the presence information specifies whether a communication link can be set up to the communication unit.

7. The presence server unit as claimed in claim 1, wherein the communication unit is a mobile radio subscriber appliance.

8. The presence server unit as claimed in claim 1, wherein the notification ranking specifies that a first portion of the plurality of checking units should be informed first of about the change to the presence information, and the remaining portion of the plurality of checking units should be informed about the change to the presence information when a further change is made to the presence information and/or after a defined time period following a change to the presence information if no communication link has been set up to the communication unit in that time period.

9. A method for controlling a presence server unit, which manages presence information relating to the availability of a communication unit, the method comprising the steps of:

the presence server unit receiving a message from each checking unit in a plurality of checking units, which message specifies that when the presence information is changed, change information relating to the change to the presence information should be transmitted to the respective checking units;

using priority information, which is information about a notification ranking on the basis of which the change information should be transmitted to the plurality of checking units and which is contained at least partially in the message received from one checking unit of the plurality of checking units, with the priority information which is contained in the message which is received from the checking unit of the plurality of checking units specifying that the change information should be transmitted to this checking unit before the change information is transmitted to the other checking units of the plurality of checking units; and when the presence information is changed, transmitting the change information on the basis of the notification ranking from the presence server unit to the plurality of checking units.

10. A communication arrangement comprising:

a presence server unit which manages presence information relating to the availability of a communication unit; and a plurality of checking units, with each checking unit from the plurality of checking units being designed to produce a message and to transmit this message to the presence server unit, which message specifies that when the presence information is changed, change information relating to the change to the presence information should be transmitted to the respective checking units, wherein the presence server unit has a memory in which priority information is stored, which priority information is information relating to a notification ranking on the basis of which the change information should be transmitted to the plurality of checking units and which are contained at least partially in the message received from one checking unit of the plurality of checking units, with the priority information which is contained in the message which is received from the checking unit from the plurality of checking units specifying that the change information should be transmitted to this checking unit before the change information is transmitted to the other checking units in the plurality of checking units, and wherein the presence server unit has an information device which is designed to transmit the change information, when the presence information is changed, in accordance with the notification ranking to the plurality of checking units.

11. A method for operating a communication arrangement having a presence server unit which manages presence information relating to the availability of a communication unit, the method comprising the steps of:

each checking unit of a plurality of checking units producing a message and transmiting this message to the presence server unit, which message specifies that when the presence information is changed, change information relating to the change to the presence information should be transmitted to the respective checking unit;

a memory in the presence server unit storing priority information, which is information relating to the notification ranking on the basis of which the change information should be transmitted to the plurality of checking units and which is contained at least partially in the message received from one checking unit of the plurality of checking units, with the priority information which is contained in the message which is received from the checking unit of the plurality of checking units specifying that the change information should be transmitted to this checking unit before the change information is transmitted to the other checking units in the plurality of checking units; and an information device in the presence server unit transmitting the change information, when the presence information is changed, in accordance with the notification ranking to the plurality of checking units.

12. A presence server unit comprising:

a managing means for managing presence information relating to the availability of a communication unit;

a receiving means for receiving a message from each checking unit of a plurality of checking units, which message specifies that, when the presence information is changed, change information relating to the change to the presence information should be transmitted to the respective checking units;

a memory means for storing priority information, which is information relating to a notification ranking on the basis of which the change information should be transmitted to the plurality of checking units and which is contained at least partially in the message received from one checking unit of the plurality of checking units, with the priority information which is contained in the message which is received from the checking unit of the plurality of checking units specifying that the change information should be transmitted to this checking unit before the change information is transmitted to the other checking units in the plurality of checking units; and an information means for transmitting the change information, when the presence information is changed, in accordance with the notification ranking to the plurality of checking units.

* * * * *